Aug. 6, 1929.
S. RUBEN
1,723,579
ELECTRIC CURRENT RECTIFIER
Filed May 13, 1926
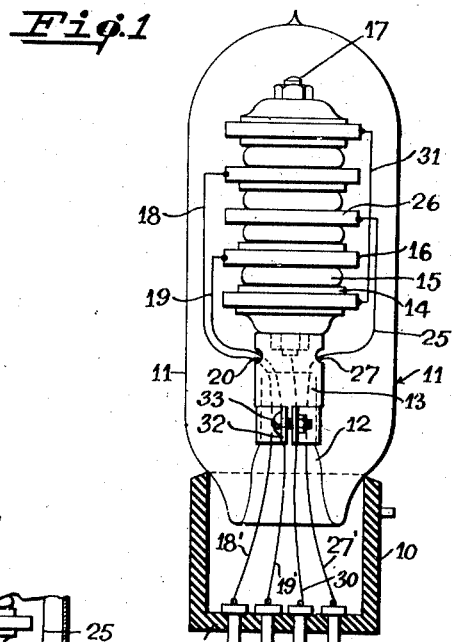
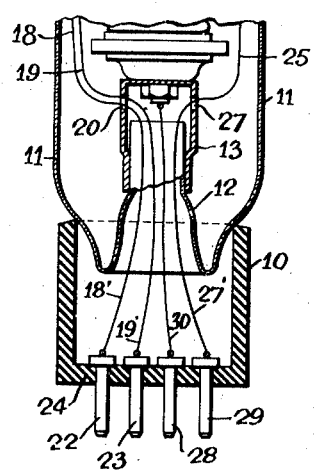
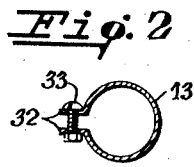
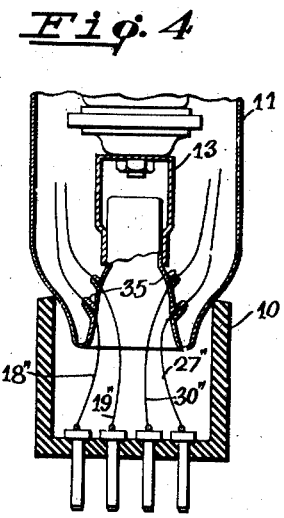
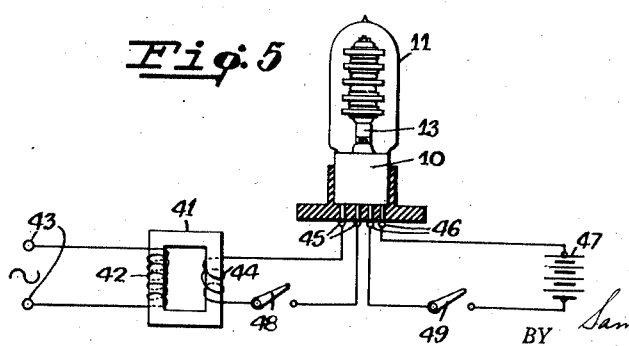
INVENTOR.
Samuel Ruben
BY
Meyer, Warfield & Watson
ATTORNEYS.

Patented Aug. 6, 1929.

1,723,579

UNITED STATES PATENT OFFICE.

SAMUEL RUBEN, OF NEW YORK, N. Y., ASSIGNOR TO RUBEN RECTIFIER CORPORATION, OF ENGLEWOOD, NEW JERSEY, A CORPORATION OF DELAWARE.

ELECTRIC-CURRENT RECTIFIER.

Application filed May 13, 1926. Serial No. 108,764.

This invention relates to electric current rectifiers and the like, and particularly to devices of this character which depend for their action upon the unilateral conductivity of asymmetric cells of the dry surface contact variety.

The object generally of the invention is to provide a device of this character which is efficient, economical and readily manufactured.

More specifically the object is to provide an arrangement of asymmetric couples of the dry surface contact variety which is adapted to function under relatively severe conditions with certainty and uniformity, the arrangement being constructed so as to be resistant to and protected against the disintegrating action of the surrounding atmosphere and other deleterious influences.

Other objects of the invention will in part be obvious and will in part appear hereinafter.

The invention accordingly comprises the features of construction, combination of elements, and arrangement of parts, which will be exemplified in the construction hereinafter set forth and the scope of the application of which will be indicated in the claims.

For a fuller understanding of the nature and objects of the invention reference should be had to the following detailed description taken in connection with the accompanying drawing, in which:

Figure 1 is a view partly in section and partly in elevation showing a rectifying device incased in an evacuated container, in accordance with the invention;

Fig. 2 is a sectional view showing a detail of the ferrule used for mounting the rectifying units in the containers shown in Fig. 1;

Fig. 3 is a fragmentary sectional view showing a detail of the incased rectifying device shown in Fig. 1;

Fig. 4 is similar to Fig. 3, but shows a modification; and

Fig. 5 shows diagrammatically a rectifying device of the present invention coupled with an electric circuit for battery-charging service.

In the practice of the present invention, an asymmetric cell or couple of the dry surface contact variety is provided which has pressure and resistance characteristics of the nature taught in my copending application, Serial No. 38,780, filed June 22, 1925. The electrode elements of the asymmetric couple likewise are preferably any pair of elements that are relatively divergent in the electro-chemical series, and have current blocking film-forming characteristics, as taught in my copending applications Serial No. 51,524 filed August 20, 1925, and Serial No. 69,215 filed November 16, 1925. For example, the electro-positive electrode element may be a metal of the alkali earth group, such as magnesium, while the electro-negative electrode element may be a metallic compound with a chemical element of the sixth periodic group such as a sulphide or selenide of copper or brass.

In order that these electrode elements shall have substantially uniform unilateral conductivity when in surface contact in a rectifying couple, they are united with pressure sufficient to withstand the dynamic effects of electrostatic repulsions generated at the contacting surfaces, and the current blocking film which forms cooperatively in conjunction therewith should have a specific resistance greater than the specific resistance of either of the electrode elements alone.

It has been ascertained that one of the chief causes for the breaking down of the unilateral conductivity of asymmetric couples of this character is due to deleterious oxidation over the contacting surfaces. Oxidation of this character increases the resistance characteristics of the electrode elements to a point where the current blocking film ceases to function, since with the increased resistance there is a decrease in the current passed and the power consumed therein (which is proportional to the $I^2R$ loss) is no longer sufficient to supply the heat of formation needed for the maintenance of the current blocking film.

It is known that discontinuous service and also sevice in which the electrode elements are allowed to remain idle for relatively long periods of time constitute adverse circumstances which not infrequently lead to the breakdown of the unilateral conductivity of the asymmetric couple. This is in part due to the fact that the repeated expansions and contractions of the electrode elements which occur when the elements are thrown into and out of service produce crevices or slight openings between the contacting surfaces into which the atmosphere or humidity may permeate and produce deleterious oxidation of the contacting surfaces. An impervious evacuated container has been found to exclude these deleterious conditions and to protect the asymmetric couple, so that once the current blocking film is properly formed, the couple will retain substantially uniform unilateral conductivity under relatively adverse circumstances for relatively long periods of time. A convenient arrangement for incorporating an assemblange of asymmetric couples, adapted for full wave rectification, within an evacuated container is here illustrated in the drawings.

In Fig. 1, 10 denotes an insulating base in which an evacuated glass container 11 of the bulb type commonly used in the construction of electric incandescent lamps is secured in the ordinary manner. The evacuated container has a re-entrant portion 12 upon which is mounted a supporting arbor or metallic ferrule 13, to which the assemblage of rectifying couples are secured.

The assemblage of rectifying couples, in order to be adapted for full wave rectification, comprises two groups here shown as superposed one above the other, the groups being inverted with respect to each other, each group here consisting of two asymmetric electric couples in series. The couples themselves, each comprises a relatively electro-positive electrode element 14, such as magnesium, and a relatively electro-negative electrode element 15, such as cupric sulphide; the couples are spaced by interposed conducting plates 16. The electrode elements, for the purposes of this invention, are preferably annular discs which are united under proper pressure by means of a bolt and nut, indicated at 17, the bolt extending through the groups and being supported from the ferrule 13.

The arrangement of asymmetric couples for full wave rectification preferred is that disclosed in my copending application which has become Patent No. 1,649,742, issued November 15, 1927. In accordance therewith the alternating current input leads, shown at 18 and 19 respectively, are connected to intermediate points in the upper and lower groups of asymmetric couples. These leads are shown as leading through openings 20 in the ferrule 13, and are soldered or otherwise conductively secured to leading-in wires passing through the sealed glass end-wall in the re-entrant portion 12. These leading-in wires, indicated at 18' and 19' respectively, are electrically connected to the conducting prongs 22 and 23 which are secured in the insulating disc 24 forming the bottom of the base 10. The conductor 25 is shown as leading from the conducting plate 26, which is disposed medially between the upper and lower groups of the asymmetric couples. The conductor 25 leads to another opening 27 in the ferrule 13, and as in the other case, is conductively connected with a leading-in conductor 27' which leads to the conducting prong 28 in the bottom disc 24. A fourth conducting prong 29 is shown in the disc 24, having the leading-in conductor 30, which is conductively connected with the end plates of the asymmetric couples. A conductor is shown at 31 for diagrammatically indicating that the upper and lower conducting end plates 16 are conductively connected and have the same polarity.

The ferrule 13 is securely mounted on the re-entrant portion of the evacuated container, as indicated in Fig. 1, in order to provide a rigid support for the assemblage of asymmetric couples within the container. This rigid support is afforded in any convenient manner. As indicated in Fig. 2, this is readily accomplished by providing the ferrule with flexible sides having lugs 32 adapted to be drawn together by a screw and nut 33 so as frictionally to grip the tip of the reentrant portion 12.

The leading-in wires from the conducting prongs are shown in Fig. 1 and more in detail in Fig. 3 as passing through that portion of the reentrant wall within the ferrule 13, so that the ferrule requires openings 20 and 27 through which the conductors 18, 19 and 25 may be inserted in order to be conductively joined to the leading-in wires 18', 19' and 27'. If it be desired to avoid this, the construction is conveniently modified as shown in Fig. 4. Here this is accomplished by forming the reentrant portion with protuberances 35 below its tip to which the ferrule is secured, the protuberances being so placed that the leading-in conductors are adapted to be led therethrough exteriorly of the ferrule as indicated at 18'', 19'', 27'' and 30''.

The rectifying device thus incased in the evacuted container and mounted in a four-prong base 10, as shown in Fig. 1, is adapted to be mounted in a four-conductor socket as shown at 40 in Fig. 5, in order to be connected in an electric system for use in battery-charging or similar service. The arrangement here shown for this purpose comprises a step-down transformer 41 having its primary 42 connected to a commercial source of alternating current indicated by the terminals 43. The secondary 44 has conductors leading to the alternating current input terminals 45 in the socket 40. The direct current output terminals are here shown at 46 and have a battery or other current-consuming device shown at 47 in the direct current circuit. Switches 48 and 49 are shown respectively in the alternating current circuit and in the direct current circuit for individually making and breaking them.

It is thus seen that the present invention provides a convenient form of incased rectifying device having substantially uniform unilateral conductivity which may be readily inserted in or disconnected from an electrical system such as shown in Fig. 5, by means of a four-conductor socket, such as is now commonly used for the attachment of similar evacuated electrical devices now in common use, for example, the four-conductor sockets which are used for the connection of three-electrode-electron-discharge tubes having incandescent filaments used in connection with radio and in current amplifying systems.

It will also be seen that, by the use of an evacuated container, the heat losses due to convection are cut down, thus conserving the heat of the $I^2R$ losses to maintain the current-blocking film of the electrodes. This follows the well-known heat-insulating properties of evacuated containers, and is capable of maintaining relatively high temperatures which are known to be more favorable than low ones on account of the negative-temperature coefficient of the material of the corrent-blocking film. The heat here dissipated is thus due to radiation, and the desired temperature is maintained by properly designing the interleaved conducting plates, such as are shown at 26, which impart heat-radiating properties to the device. If, for any reason, the plates, shown at 26, are desired to be of a given size, but less radiation than normally attending such size is wanted, the proper radiation may be achieved by suitably coating the asymmetric couples with relatively non-radiating coatings, for example, with a white coating.

While evacuated containers have been here shown as the means for protecting the asymmetric couples from the deleterious influences of the atmosphere and of humidity and for reducing undesired radiation losses, it is obviously within the scope of the invention to employ containers containing an inert gas such as helium, argon and the like. Such gas-filled containers may be desired in certain instances where it is desired to increase the heat losses above those normally incident to an evacuated container, and to utilize convection as the additional heat-dissipating means in the manner well-known to the electric incandescent lamp art. Containers of the type disclosed, filled with an inert gas, above or slightly below atmospheric pressure, are therefore to be regarded as within the fair range of the equivalent evacuated container disclosed as an element of the present invention.

Since certain changes may be made in the above construction and different embodiments of the invention could be made without departing from the scope thereof, it is intended that all matter contained in the above description or shown in the accompanying drawing shall be interpreted as illustrative and not in a limiting sense.

Having described my invention, what I claim as new and desire to secure by Letters Patent is:

1. The combination with an evacuated re-entrant container having a supporting arbor mounted on the re-entrant tip, of an asymmetric couple comprising dry annular discs of respectively electro-positive and electro-negative materials, and a bolt passing through said annular discs and securing the same to said arbor in proper insulated relation thereto, and a base for said container having conductors arranged therewith for operatively connecting said asymmetric couple in an electrical system.

2. The combination with an evacuated re-entrant container having a supporting arbor formed with a flexible wall arranged frictionally to grip the tip of the re-entrant portion of said container, of a securing bolt extending upwardly from said arbor, a plurality of asymmetric couples each composed of relative electro-positive and electro-negative annular discs slipped over said bolt and arranged in proper insulating position with respect to the same, and a base for said container and four conductors associated therewith, a pair being adapted to serve as the alternating current circuit terminals and a pair as the direct current circuit terminals, said conductors having leading-in wires operatively connecting the same with the elements of said asymmetric couples.

In testimony whereof I affix my signature.

SAMUEL RUBEN.